F. L. KRYDER AND E. W. SNYDER.
APPARATUS FOR RECLAIMING RUBBER WASTE.
APPLICATION FILED MAR. 8, 1918.
1,340,776.                                           Patented May 18, 1920.
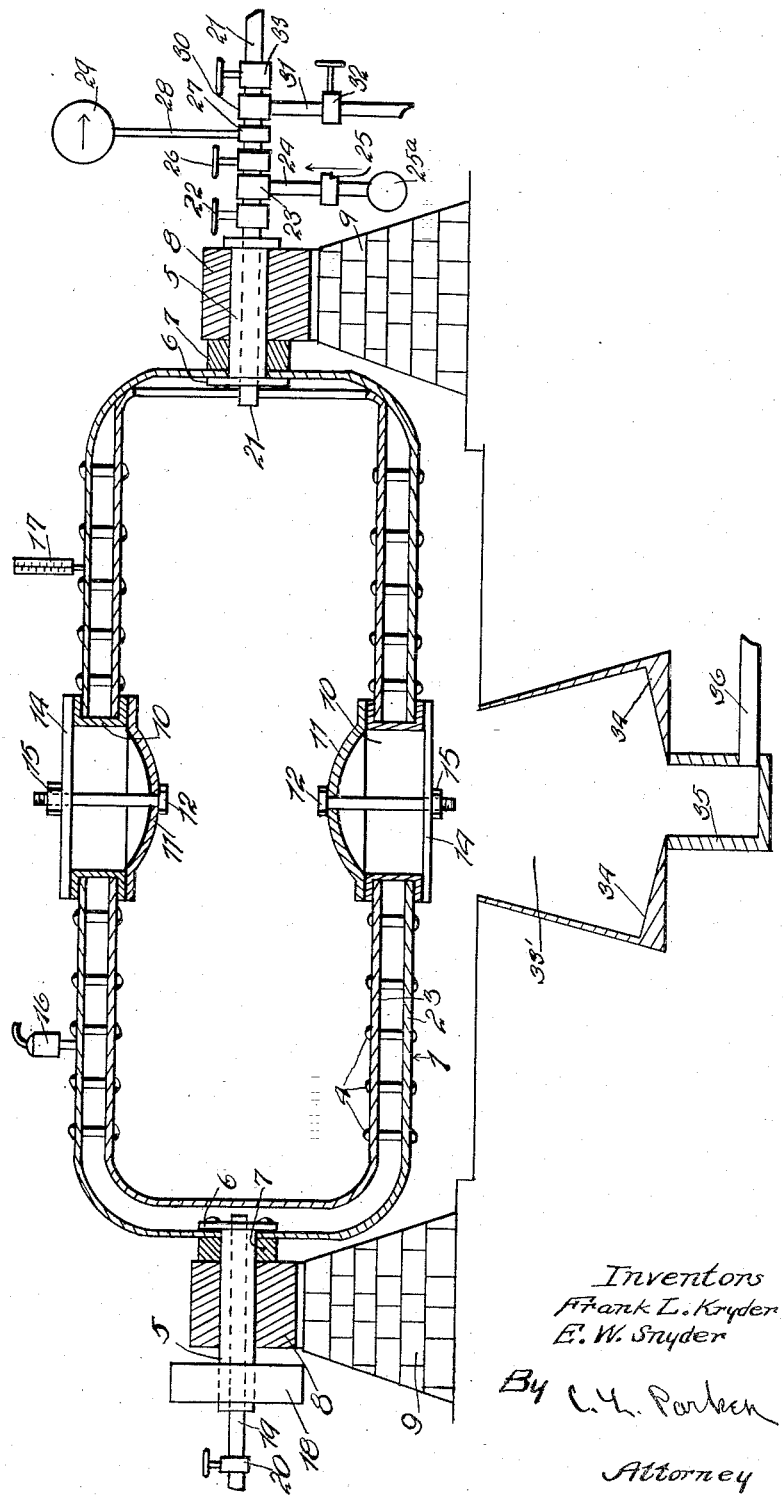
Inventors
Frank L. Kryder
E. W. Snyder
By C. L. Parker
Attorney

UNITED STATES PATENT OFFICE.

FRANK L. KRYDER, OF AKRON, OHIO, AND EDGAR W. SNYDER, OF INDIANAPOLIS, INDIANA.

APPARATUS FOR RECLAIMING RUBBER-WASTE.

1,340,776.　　　　Specification of Letters Patent.　　Patented May 18, 1920.

Application filed March 8, 1918. Serial No. 221,251.

*To all whom it may concern:*

Be it known that we, FRANK L. KRYDER and EDGAR W. SNYDER, citizens of the United States, residing at Akron, in the county of Summit and State of Ohio, and Indianapolis, in the county of Marion and State of Indiana, respectively, have invented certain new and useful Improvements in Apparatus for Reclaiming Rubber-Waste, of which the following is a specification.

Our invention relates to an apparatus for reclaiming rubber waste.

An important object of the invention is to provide means for treating rubber waste, for obtaining therefrom reclaimed rubber of a high grade.

Other objects and advantages of the invention will be apparent during the course of the following description.

In the accompanying drawing forming a part of this specification, the figure is a central vertical longitudinal section through apparatus embodying our invention, parts being shown in elevation.

In the drawing, wherein for the purpose of illustration is shown a preferred embodiment of our apparatus, the numeral 1 designates a closed rotatable digester or casing, comprising an outer shell 2 and an inner shell 3, arranged in spaced relation, to form a heating chamber or jacket, as shown. The shells 2 and 3 are rigidly connected by means of stay-bolts or rivets 4.

Extending through openings in the ends of the outer shell 2 are tubular shafts 5, having their inner ends provided with annular flanges 6, which are bolted or otherwise rigidly connected with the shell 2. Surrounding the tubular shafts 5 and contacting with the ends of the shell 2 are rings 7, which are preferably rigidly clamped to the tubular shafts 5.

The tubular shafts 5 are journaled through bearings 8, supported by uprights 9, as shown.

The shell or digester 1 is provided with man-holes which are surrounded by flanged plates 10, formed U-shaped in cross-section. These plates 10 are secured to the shells 2 and 3 by any suitable means. The openings of the flanged plates 10, which are preferably circular are adapted to be closed by covers 11, contacting with the inner sides thereof. These covers carry bolts 12, extending outwardly, and passing through openings in bars 14. These bolts have their outer ends screw-threaded to receive nuts 15, as shown.

The numeral 16 designates a safety valve, leading into the space between the shells 2 and 3. Leading into the space between the shells 2 and 3 is a thermometer 17 of any well known or preferred type.

The numeral 18 designates a pulley rigidly secured to one tubular shaft 5. This pulley may be rotated by any suitable means. Extending into and through one tubular shaft 5, is a steam supply pipe 19 equipped with a cut off valve 20. The steam supply pipe discharges into the space or jacket between the shells 2 and 3.

Extending into and through the other tubular shaft 5 is a liquid supply pipe 21, leading into the interior of the shell 3, as shown. The pipe 21 is equipped with a cut off valve 22 and has connection with a T-coupling 23, connected with a liquid supply pipe 24. The pipe 24 is connected with a force pump 25ª for forcing liquid under pressure into the digester, and between this pump and the T-coupling 23 is located a check valve 25. A cut off valve 26 is connected in the pipe 21, outwardly of the coupling 23. Connected in the pipe 21 is a second T-coupling 27, having connection with a pipe 28 connected with a pressure gage 29. Connected in the pipe 21 is a third T-coupling 30, having connection with a second liquid supply pipe 31 equipped with a cut off valve 32. A cut off valve 33 is connected in the pipe 31 and is arranged outwardly of the coupling 30.

Arranged beneath the shell of the digester 1 and in transverse alinement with the manholes, is a tank or well 33', having inclined bottom walls 34, discharging into a collecting pocket 35, having communication with a pipe 36.

In preparing the rubber waste for treatment, in accordance with our process, it is first treated by a well known or preferred method to remove therefrom cloth, sand, dirt, metal or other foreign substances, and is thoroughly disintegrated as by being ground or finely divided.

In the practice of our process, the disintegrated rubber waste, freed from cloth, sand, dirt, metal and the like, as described, is treated with a mixture of anilin oil, rubber resin, and a mineral solvent, preferably a mineral hydrocarbon, such as gasolene or kerosene, to which mixture may be advantageously added carbolic acid. This mixture will be hereinafter referred to as "Solution A." In the preferred practice of our process the disintegrated rubber waste is subjected to treatment with a mixture of anilin oil, rubber resin, mineral hydrocarbon and carbolic acid, in the preferred proportions of 10 parts by weight of anilin oil, 10 parts by weight of rubber resin, 2 parts by weight of mineral hydrocarbon, and 1 part by weight of carbolic acid. This treatment is carried out in a digester at an elevated temperature, preferably at a temperature of approximately 307 to 390° F., for approximately an hour or longer, depending upon the character or condition of the rubber waste. In the treatment of rubber waste ordinarily encountered the treatment may be advantageously continued for an hour and a half under a pressure of preferably 60 pounds per square inch.

The resulting mass is then passed through one of the man-holes into the inner shell 3, together with a sufficient amount of water, to produce the desired results. We have found that satisfactory results are ordinarily produced by employing 25 to 27 parts by weight of water to 100 parts by weight of the mass. The man-hole is then closed, and the valve 20 is opened, while the valve 22 is closed. Steam is now admitted into the space or jacket between the shells 2 and 3 to heat the mass without such steam coming into direct contact with the mass under treatment. During this heating operation power is applied to the pulley 18, which rotates the entire shell or digester 1, thereby subjecting the mass to thorough and violent agitation.

The mass, while being heated, within the inner shell 3 is preferably maintained under a pressure of from 60 to 100 pounds to the square inch depending upon the character or condition of the rubber waste, and this heating operation is ordinarily continued from six to ten hours. After this operation has been completed, a solution, hereinafter termed "Solution B," is introduced into the inner shell 3 in the presence of the mass. This solution preferably contains an organic acid preferably acetic acid, turpentine and a mineral solvent, preferably naphtha. We prefer to employ in "Solution B" 5 parts by weight of acetic acid, 1 part by weight of turpentine, and 2 parts by weight of naphtha. "Solution B" is pumped into the shell 3 by means of a force pump 25ª through the pipe 24, the valve 22 being opened for this purpose. It is to be understood that during this operation the valves 32 and 33 are closed while the valve 26 is opened. This "Solution B" is forced into the inner shell 3 until the pressure gage 29 indicates a sufficient amount of increased pressure which may advantageously be 125 to 275 pounds per square inch. The object of introducing the "Solution B" in the manner described is to increase the pressure within the inner shell 3 without raising the temperature therein, as this has been found to produce a superior grade of reclaimed rubber waste.

After the desired increased pressure is obtained the valve 22 may be closed, the digester 1 rotated and heated as hereinabove described.

It will be apparent that the initial treatment of the disintegrated rubber waste with "Solution A" may be advantageously conducted in the digester illustrated. When this is done, valves 23 and 25 being closed and valves 22, 26 and 32 being opened, the solution is admitted through pipes 31 and 21 to the inner shell 3, and the rubber waste heated therein by means of steam admitted to the steam jacket through pipe 19. It will also be apparent that the water added to the mass resulting from the treatment of the rubber waste with "Solution A" may be admitted through pipe 21 and that the entire treatment of the disintegrated rubber waste may be conveniently conducted in our apparatus.

The quantities of "Solution A" and "Solution B" which we employ, vary with the character and condition of the rubber waste, and the temperature and pressure varies accordingly, the whole depending somewhat upon the purpose for which the rubber waste is to be used, as will be readily understood by those skilled in the rubber reclaiming art.

It is to be understood that the form of our invention herewith shown and described is to be taken as a preferred example of the same, and that various changes in the shape, size, and arrangement of parts may be resorted to without departing from the spirit of the invention or the scope of the subjoined claims.

Having thus described our invention, we claim:—

In apparatus of the character described, a pair of spaced bearings, a vertically rotatable shell arranged between the bearings in an approximately horizontal position and having a steam jacket which surrounds its periphery and one end thereof while its opposite end is uncovered by the steam jacket, tubular members secured to the ends of the shell with one tubular member leading into the steam space of the jacket and the other tubular member leading into the interior of the shell, a steam pipe extending into the first-mentioned tubular member, an inlet pipe extending through the second named tubular member and adapted to discharge material to be treated to the interior of the shell, and a pump connected with the inlet pipe and adapted to supply a treating solution to the interior of the shell through the inlet pipe, said pump being adapted to supply the solution under suitable pressure to increase the pressure within the shell without substantially increasing its temperature.

In testimony whereof we affix our signatures.

FRANK L. KRYDER.
EDGAR W. SNYDER.